(12) United States Patent
Tseng (10) Patent No.: US 11,067,142 B2
(45) Date of Patent: Jul. 20, 2021

(54) HYDRAULIC PISTON RESETTING TOOL FOR DISK BRAKE

(71) Applicant: NUEVO PRODUCTS DEVELOPMENT CO., LTD., Changhua (TW)

(72) Inventor: Chao-Ching Tseng, Changhua (TW)

(*) Notice: Subject to any disclaimer, the term of this patent is extended or adjusted under 35 U.S.C. 154(b) by 169 days.

(21) Appl. No.: 16/592,260

(22) Filed: Oct. 3, 2019

(65) Prior Publication Data

US 2021/0071725 A1 Mar. 11, 2021

(30) Foreign Application Priority Data

Sep. 10, 2019 (CN) .......................... 201910854547.0

(51) Int. Cl.
*B66F 3/00* (2006.01)
*F16D 65/00* (2006.01)
*B25B 27/00* (2006.01)
*B25B 27/02* (2006.01)

(52) U.S. Cl.
CPC ...... *F16D 65/0043* (2013.01); *B25B 27/0035* (2013.01); *B25B 27/023* (2013.01); *B25B 27/026* (2013.01)

(58) Field of Classification Search
CPC ...... B66F 3/00; B66F 3/10; B66F 3/28; B66F 5/00; B66F 7/00; B66F 7/04; B66F 7/08
See application file for complete search history.

(56) References Cited

U.S. PATENT DOCUMENTS

| 4,339,989 | A † | 7/1982 | Webster |
| 8,826,504 | B1 | 9/2014 | Slivon |
| 10,156,273 | B1 | 12/2018 | Huang |
| 10,670,056 | B2 * | 6/2020 | Wu ...................... B25B 27/0021 |
| 2010/0212924 | A1 | 8/2010 | Liu |
| 2012/0266428 | A1 | 10/2012 | Hodges et al. |
| 2019/0076997 | A1 * | 3/2019 | Hernandez, Jr. ..... B25B 27/0035 |
| 2020/0063768 | A1 * | 2/2020 | Wu ...................... B25B 27/0021 |
| 2020/0317479 | A1 * | 10/2020 | Wu .......................... B66F 3/36 |
| 2021/0071725 | A1 * | 3/2021 | Tseng .................... B25B 27/023 |

FOREIGN PATENT DOCUMENTS

| EP | 1020255 A2 | 7/2000 |
| GB | 2576392 A | 2/2020 |
| TW | I583509 B | 5/2017 |

* cited by examiner
† cited by third party

*Primary Examiner* — Lee D Wilson (57) ABSTRACT

A hydraulic piston resetting tool for a disk brake includes a main body, a first pressing plate, a second pressing plate and a holding pole, wherein, one side of the main body is connected to the first pressing plate, the second pressing plate is adjacent to the other side of the main body, and the holding pole is connected to the front end of the main body. The inside of the main body is pivotally configured with a first cylinder barrel, the inside of the first cylinder barrel is pivotally configured with a second cylinder barrel, and the inside of the second cylinder barrel is pivotally configured with a stopping piece. The stopping piece is connected to the second pressing plate. The stopping piece activates the reciprocating displacement of the second pressing plate.

8 Claims, 12 Drawing Sheets

HYDRAULIC PISTON RESETTING TOOL FOR DISK BRAKE

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a special car repair tool, and more particularly to an innovative structural design of a hydraulic piston resetting tool for disk brakes.

2. Description of Related Art Including Information Disclosed Under 37 CFR 1.97 and 37 CFR 1.98

A disk brake assembly comprises a brake disc and a brake caliper, wherein, the piston of the brake caliper pushes the brake pad to move toward the brake disc, so as to reduce the rotational speed of the brake disc.

Patent publication TWI583509 discloses a kind of piston resetting tool for disk brake assemblies. When replacing the brake pad, this tool is used to press the piston and push it back into the caliper.

To match different types of brake discs, the space width of the calipers to allow movement of the brake discs may be different. In the case of a large-size caliper, the displacement range of the stopping piece of the tool may not be enough to force the piston to go back to the inside of the caliper. If the displacement range is to be increased, the thickness of the tool body will be increased, making it impossible for the tool to enter calipers of smaller sizes. In a word, it is difficult for the tool to be applied in calipers of various sizes to reset the piston.

In view of this, the inventor developed the present invention of practicability based on his years of experience in the production, development and design of related products. Through meticulous designs and careful assessments, the inventor successfully solved the above problem.

BRIEF SUMMARY OF THE INVENTION

The main object of the present invention is to provide a hydraulic piston resetting tool for disk brake. As a technical breakthrough, it aims to find a solution to develop a universal tool to reset pistons for calipers of various sizes.

Based on the above-mentioned object, the present invention is a hydraulic piston resetting tool for disk brake, including a main body, a first pressing plate, a second pressing plate and a holding pole, wherein one side of the main body is connected to the first pressing plate, the second pressing plate is adjacent to one side of the main body, and the holding pole is connected to the front end of the main body.

The inside of the main body is formed with a first chamber, a second chamber and a communicating passage, wherein, the communicating passage communicates the first chamber and the second chamber, and the second chamber extends to one side of the main body adjacent to the second pressing plate. The main body is pivotally configured with a first cylinder barrel inside the second chamber. The inside of the first cylinder barrel is formed with a third chamber. The third chamber is communicated with the second chamber. The first cylinder barrel is pivotally configured with a second cylinder barrel inside the third chamber. The inside of the second cylinder barrel is formed with a fourth chamber. The fourth chamber is communicated with the third chamber. The second cylinder barrel is pivotally configured with a stopping piece on the fourth chamber. One end of the stopping piece is configured with an extension rod protruding axially. The extension rod goes through the second cylinder barrel and is connected to the second pressing plate.

The holding pole is connected to the main body. The holding pole is formed with a cylinder chamber, which is communicated with the first chamber. Working fluid is filled between the cylinder chamber and the stopping piece.

With such a design, the second pressing plate can be pushed farther away from the main body without having to increase the thickness of the main body. The tool can be applied to reset the piston for calipers of various sizes.

DETAILED DESCRIPTION OF THE INVENTION

Referring to FIGS. 1 to 4, Embodiment 1 of the piston resetting tool for brake includes a main body 10, a first pressing plate 22, a second pressing plate 24 and a holding pole 30, wherein, one side of the main body 10 is connected to the first pressing plate 22, the second pressing plate 24 is adjacent to the other side of the main body 10, and the holding pole 30 is connected to the front end of the main body 10. The inside of the main body 10 is formed with a first chamber 11, a second chamber 12 and a communicating passage 13. The communicating passage 13 communicates the first chamber 11 and the second chamber 12. The first chamber 11 is extended on the front end of the main body 10. The second chamber 12 is extended on the side of the main body 10 adjacent to the second pressing plate 24.

The main body 10 is pivotally configured with a first cylinder barrel 40 inside the second chamber 12, so that the first cylinder barrel 40 can move to and fro inside the second chamber 12 toward the first pressing plate 22 or away from the first pressing plate 22. The inside of the first cylinder barrel 40 is formed with a third chamber 41. The end of the third chamber 41 facing the first pressing plate 22 is communicated with the second chamber 12. The first cylinder barrel 40 is pivotally configured with a second cylinder barrel 50 inside the third chamber 41, so that the second cylinder barrel 50 can move to and fro inside the third chamber 41 toward the first pressing plate 22 or away from the first pressing plate 22. The inside of the second cylinder barrel 50 is formed with a fourth chamber 51. The end of the fourth chamber 51 facing the first pressing plate 22 is communicated with the third chamber 41. The second cylinder barrel 50 is pivotally configured with a stopping piece 60 inside the fourth chamber 51. One end of the stopping piece 60 is configured with an extension rod 62 protruding axially. The extension rod 62 goes through the second cylinder barrel 50 and is connected to the second pressing plate 24. Thus, the stopping piece 60 can stop the second pressing plate 24 from moving to and fro in directions toward the first pressing plate 22 or away from the first pressing plate 22.

The rear end of the holding pole 30 enters the first chamber 11 and is connected to the main body 10 through threaded joint. The inside of the first chamber 11 is configured with an O ring 14. The holding pole 30 is pushed on the 0 ring 14. The inside of the holding pole 30 is axially formed with a cylinder chamber 31, a screw hole 32 and a center hole 33. The rear end of the cylinder chamber 31 is communicated with the first chamber 11, so that the cylinder chamber 31 is communicated with the second chamber 12 through the communicating passage 13. The front end of the cylinder chamber 31 is communicated with the center hole 33. The screw hole 32 is configured on the front end of the holding pole 30. The rear end of the screw hole 32 is communicated with the center hole 33. The inside of the cylinder chamber 31 is pivotally configured with a plunger 34. Working fluid is filled between the plunger 34 and the stopping piece 60 (not shown in the drawing). The holding pole 30 is configured with a screw rod 35 through threaded joint into the screw hole 32. The front end of the screw rod 35 is protruding out of the front end of the holding pole 30. The rear end of the screw rod 35 is axially connected to the plunger 34, so that the plunger 34 can move toward the communicating passage 13 or away from the communicating passage 13. Hydraulic oil is preferred embodiment of the working fluid.

Figure 1:
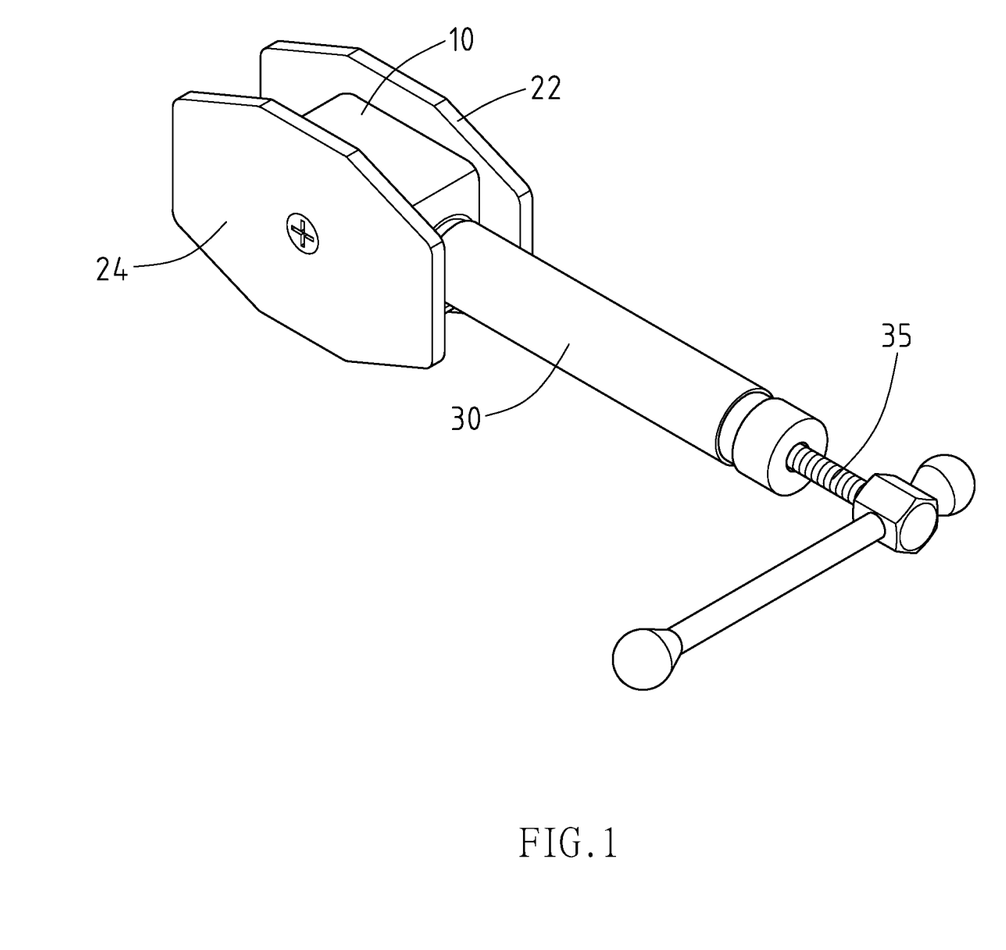
FIG. 1 is a perspective view of Embodiment 1 of the present invention.
Figure 2:
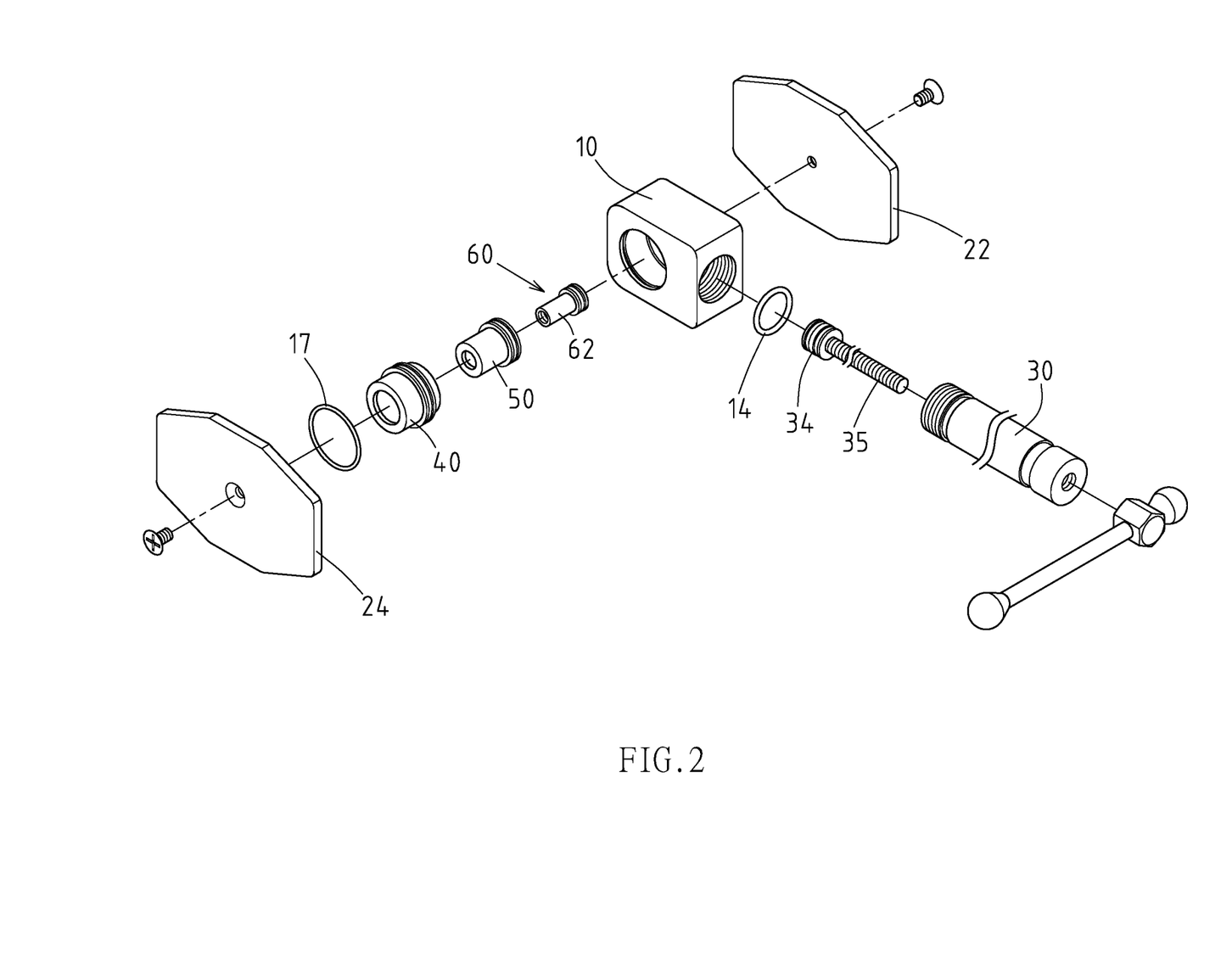
FIG. 2 is an exploded perspective view of Embodiment 1 of the present invention.
Figure 3:
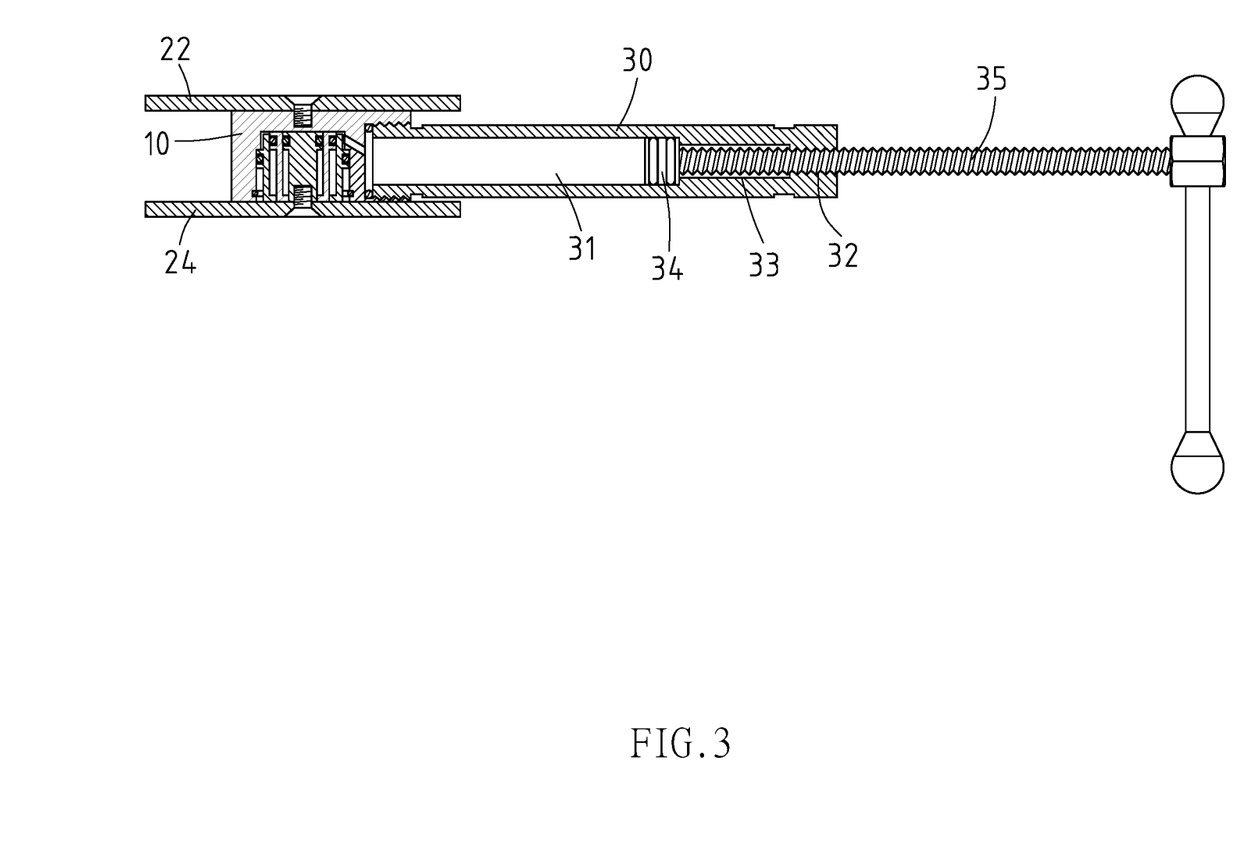
FIG. 3 is a sectional view of Embodiment 1 of the present invention.
Figure 4:
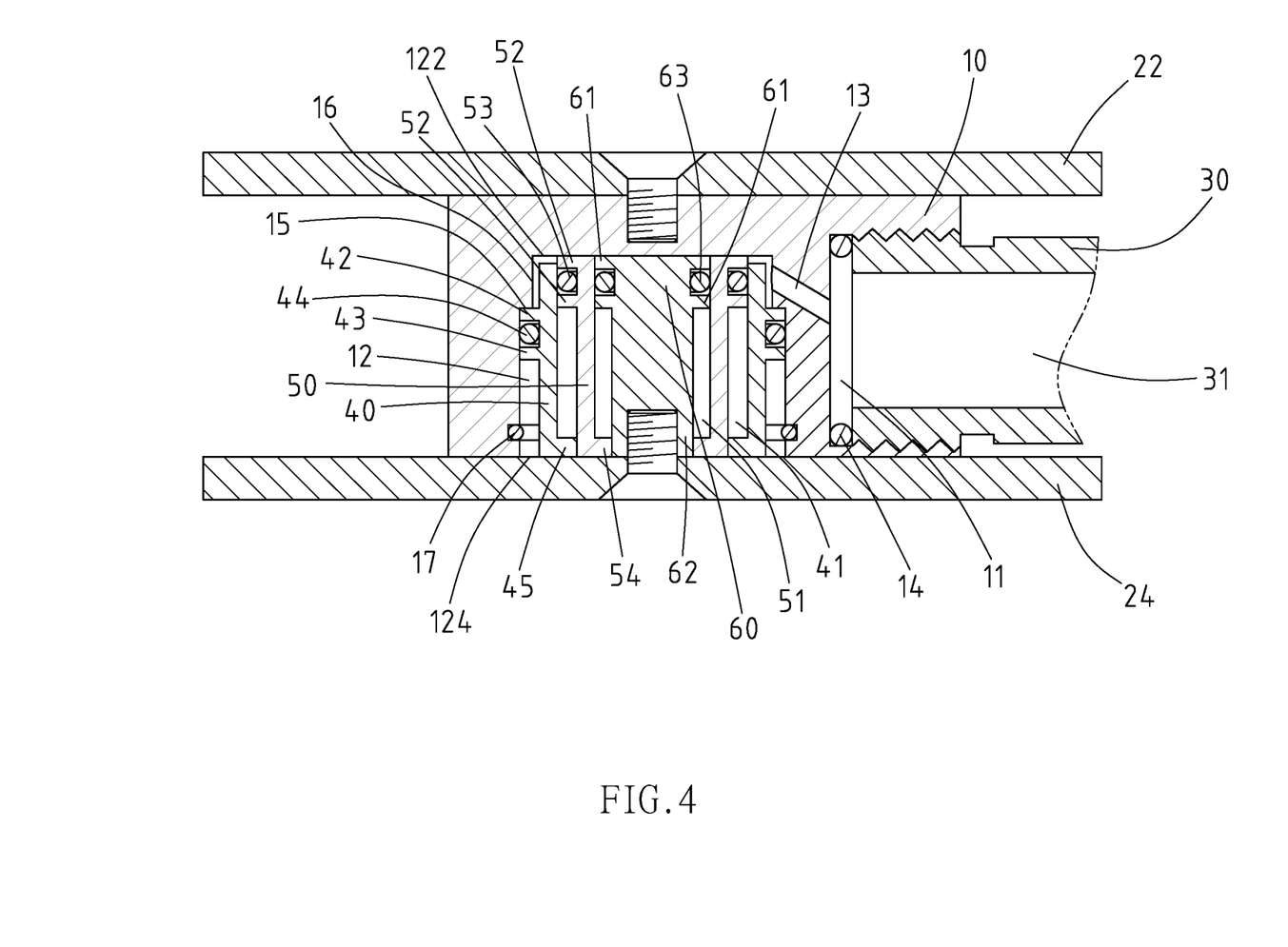
FIG. 4 is an enlarged view of the main body in FIG. 3.
Figure 5:
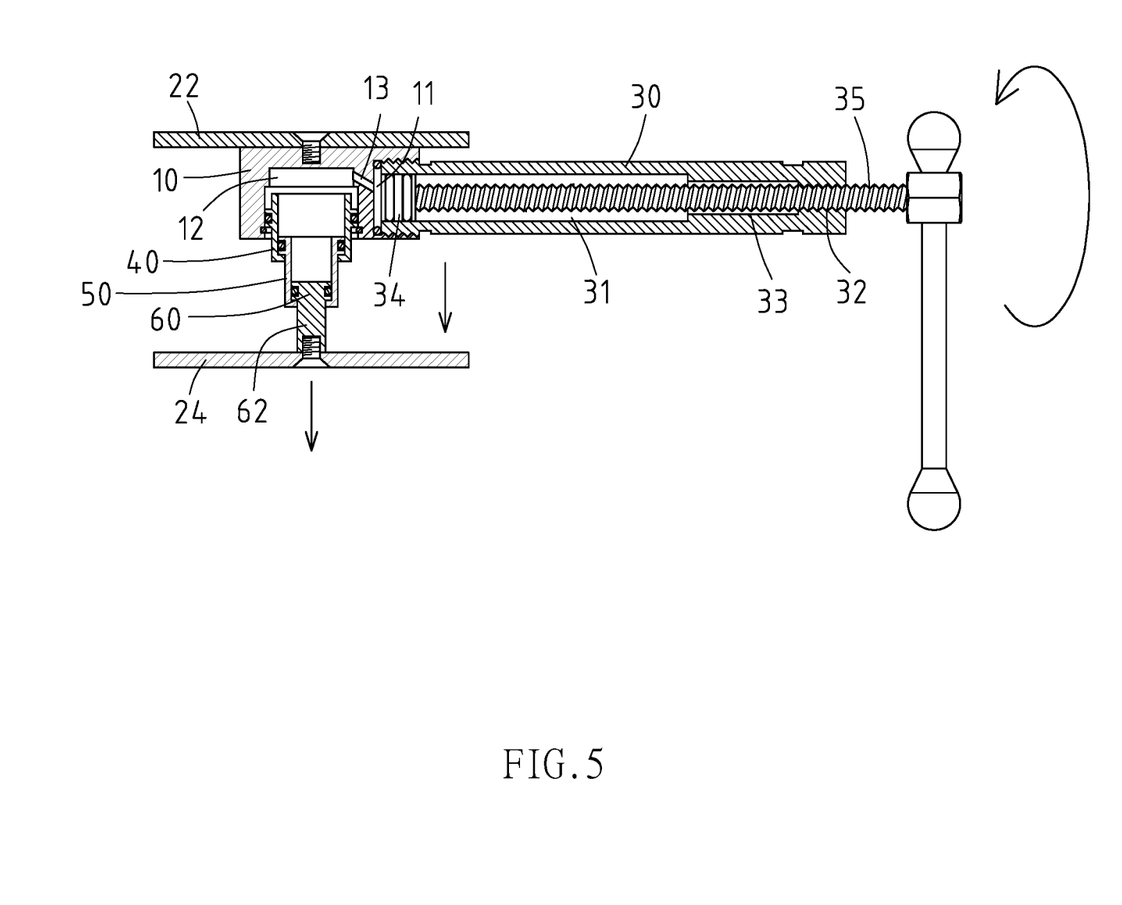
FIG. 5 is a sectional view of the operational state of Embodiment 1 of the resent invention.
Figure 6:
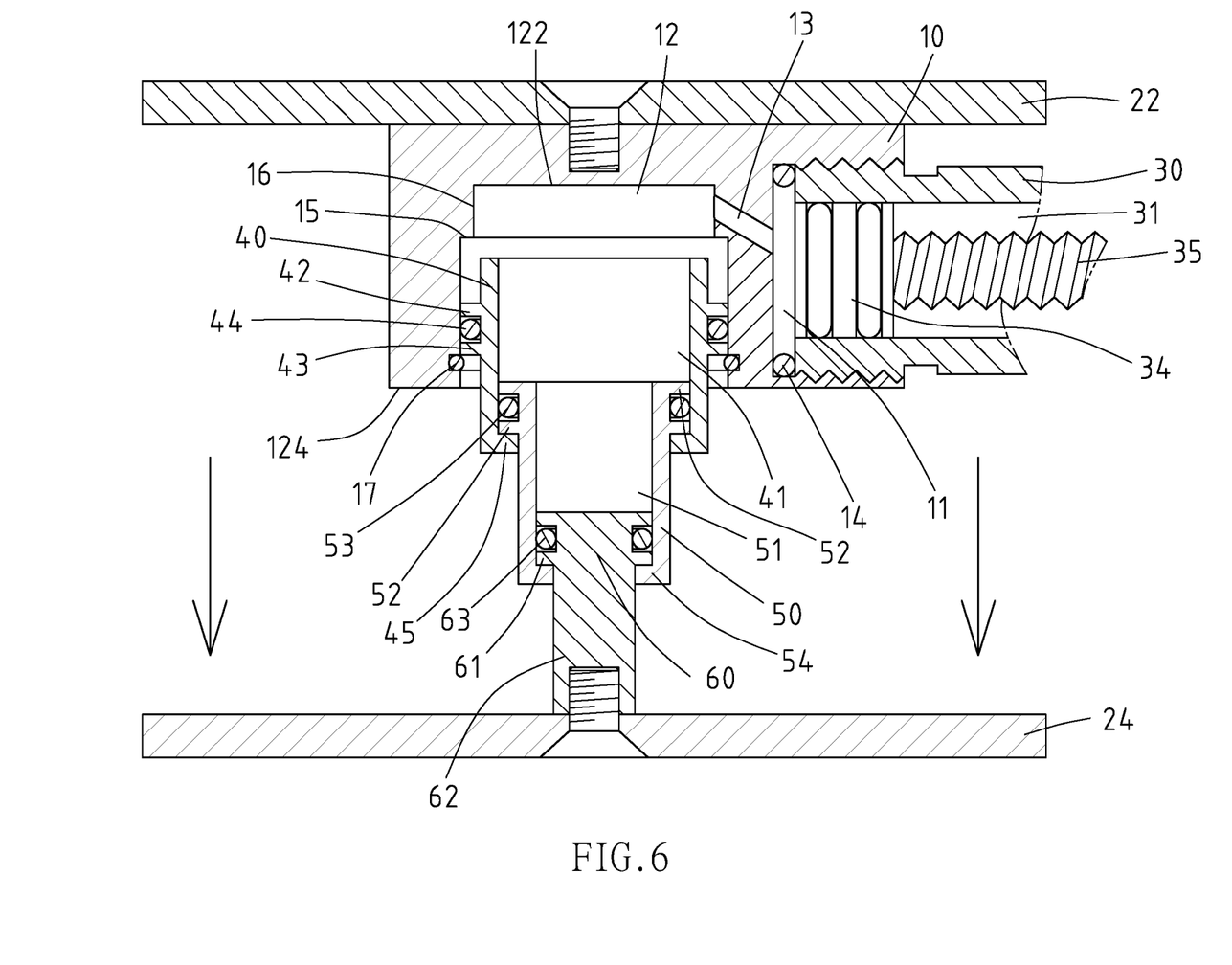
FIG. 6 is an enlarged view of the main body in FIG. 5.

Referring to FIGS. 5 and 6, by rotating the screw rod 35 to force the plunger 34 to move toward the main body 10, the plunger 34 will push the working fluid, forcing the first cylinder barrel 40, the second cylinder barrel 50, the stopping piece 60 and the second pressing plate 24 to move respectively away from the first pressing plate 22, and consequently pressing the piston to go back into the caliper.

By rotating the screw rod 35 reversely, the plunger 34 will move away from the main body 10, and the stopping piece 60 together with the second pressing plate 24 will move toward the first pressing plate 22, thus moving the main body 10, the first pressing plate 22 and the second pressing plate 24 out of the caliper.

Further, one end of the second chamber 12 is first end 122, the other end is second end 124. The first end 122 is adjacent to the first pressing plate 22, the second end 124 is adjacent to the second pressing plate 24. The middle portion of the periphery of the first cylinder barrel 40 expands outward to form a first ring plate 42. The communicating passage 13 is communicated with the side of the second chamber 12 located between the first end 122 and the first ring plate 42, so that the pressure of the working fluid can act on the first ring plate 42, forcing the first cylinder barrel 40 to move. Alternatively, the first ring plate 42 can also be formed on the periphery of the terminal end of the first cylinder barrel 40 adjacent to the first end 122.

The second chamber 12 is formed with a ring-shaped supporting surface 15. The supporting surface 15 is adjacent to the first end 122, and the communicating passage 13 is communicated with the end of the second chamber 12 located between the first end 122 and the supporting surface 15. The ring-shaped inner edge of the supporting surface 15 is smaller than the outer periphery of the first ring plate 42, so that the first ring plate 42 can be pushed against the supporting surface 15.

The second chamber 12 is reduced in the radial direction to form a first side wall 16. One end of the first side wall 16 is connected to the first end 122. The other end of the first side wall 16 is formed with the supporting surface 15. The inner diameter of the first side wall 16 is smaller than the outer diameter of the first ring plate 42, so that the first ring plate 42 can be pushed against the supporting surface 15. Moreover, the inner diameter of the first side wall 16 is larger than the outer diameter of the first cylinder barrel 40.

Based on the relative constitution of the first ring plate 42 and the supporting surface 15, when the first cylinder barrel 40 moves toward the first pressing plate 22, the first ring plate 42 is pushed against the supporting surface 15. As the supporting surface 15 limits the distance of movement of the first cylinder barrel 40 toward the first pressing plate 22, and the inner diameter of the first side wall 16 is larger than the outer diameter of the first cylinder barrel 40, the working fluid can pass through the communicating passage 13 and enter the second chamber 12. A hydraulic action is applied upon the side of the first cylinder barrel 40 and the first ring plate 42 facing the first end 122, so that the second cylinder barrel 50 moves away from or toward the first pressing plate 22, and the working fluid can flow into or out of the third chamber 41.

The inner wall of the side of the second chamber 12 adjacent to the second pressing plate 24 is embedded with a first snap ring 17. The middle portion of the periphery of the first cylinder barrel 40 expands outward to form a second ring plate 43. The second ring plate 43 is located between the first ring plate 42 and the first snap ring 17. A first seal ring 44 is sleeved between the first ring plate 42 and the second ring plate 43.

The side of the first cylinder barrel 40 adjacent to the second pressing plate 24 is formed with a ring-shaped first limiting plate 45. The periphery of one side of the second cylinder barrel 50 adjacent to the first pressing plate 22 is formed with two ring-shaped third ring plates 52. The periphery of the second cylinder barrel 50 is sleeved with a second seal ring 53 on each of the third ring plates 52. The inner diameter of the first limiting plate 45 is smaller than the outer diameter of each of the third ring plates 52, so that the first limiting plate 45 can limit the distance of movement of the second cylinder barrel 50 in the direction away from the first pressing plate 22.

The side of the second cylinder barrel 50 adjacent to the second pressing plate 24 is formed with a ring-shaped second limiting plate 54. The periphery of one end of the stopping piece 60 adjacent to the first pressing plate 22 is formed with two ring-shaped fourth ring plates 61. The outer periphery of the stopping piece 60 is sleeved with a third seal ring 63 between the fourth ring plates 61. The inner diameter of the second limiting plate 54 is smaller than the outer diameter of the fourth ring plates 61, so that the second limiting plate 54 can limit the distance of movement of the stopping piece 60 in the direction away from the first pressing plate 22.

Figure 7:
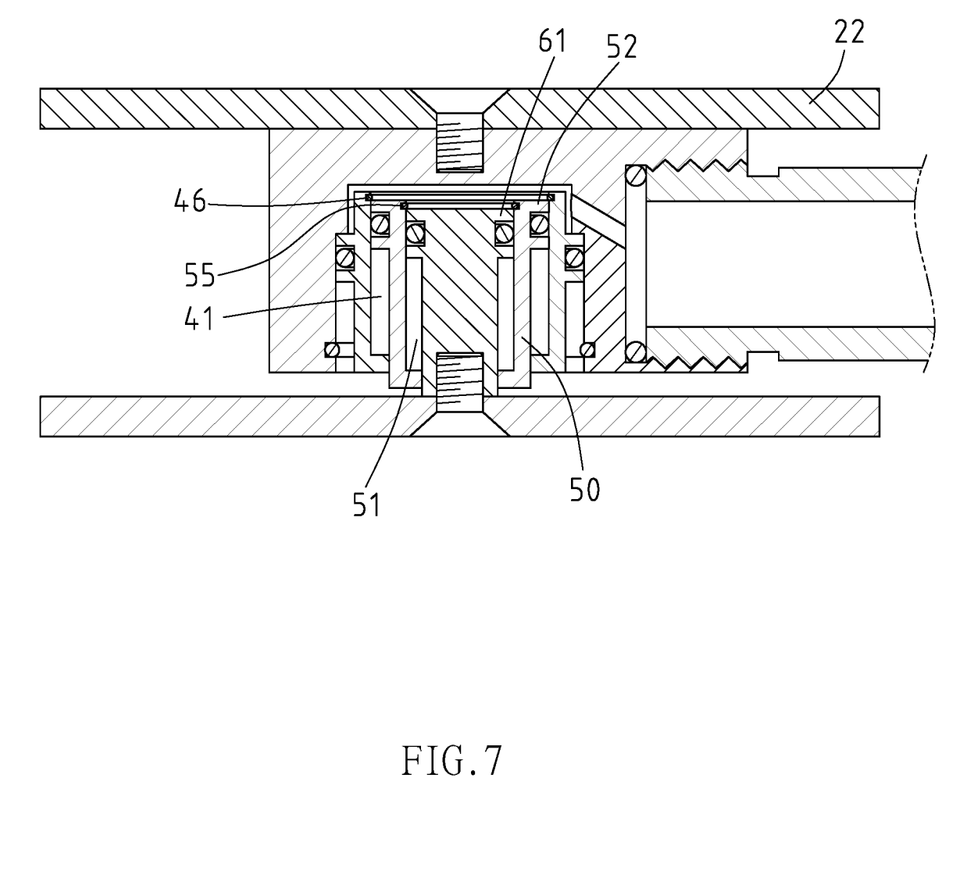
FIG. 7 is a partially enlarged sectional view of the main body of Embodiment 2 of the present invention.
Figure 8:
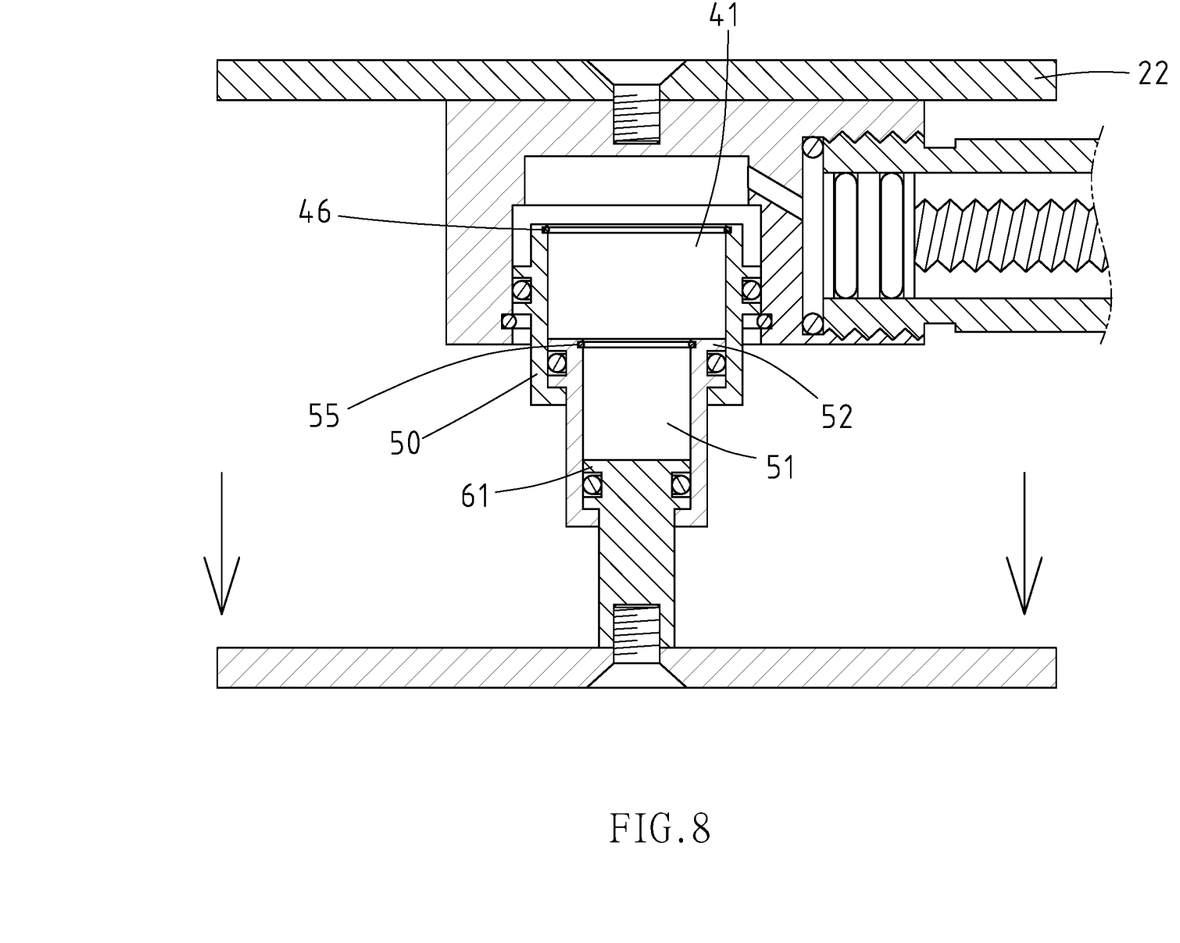
FIG. 8 is a partially enlarged sectional view of the operational state of the main body of Embodiment 2 of the present invention.

Referring to FIGS. 7 and 8, the side of the third chamber 41 and the fourth chamber 51 adjacent to the first pressing plate 22 can be embedded with a second snap ring 46 and a third snap ring 55 as needed, thus forming Embodiment 2 as a variation based on Embodiment 1. The inner diameter of the second snap ring 46 is between the inner diameter and outer diameter of each of the third ring plates 52, the inner diameter of the third snap ring 55 is between the inner diameter and outer diameter of each of the fourth ring plates 61, so that the second snap ring 46 can limit the distance of movement of the second cylinder barrel 50 in the direction toward the first pressing plate 22, while the third snap ring 55 can limit the distance of movement of the stopping piece 60 in the direction toward the first pressing plate 22.

Figure 9:
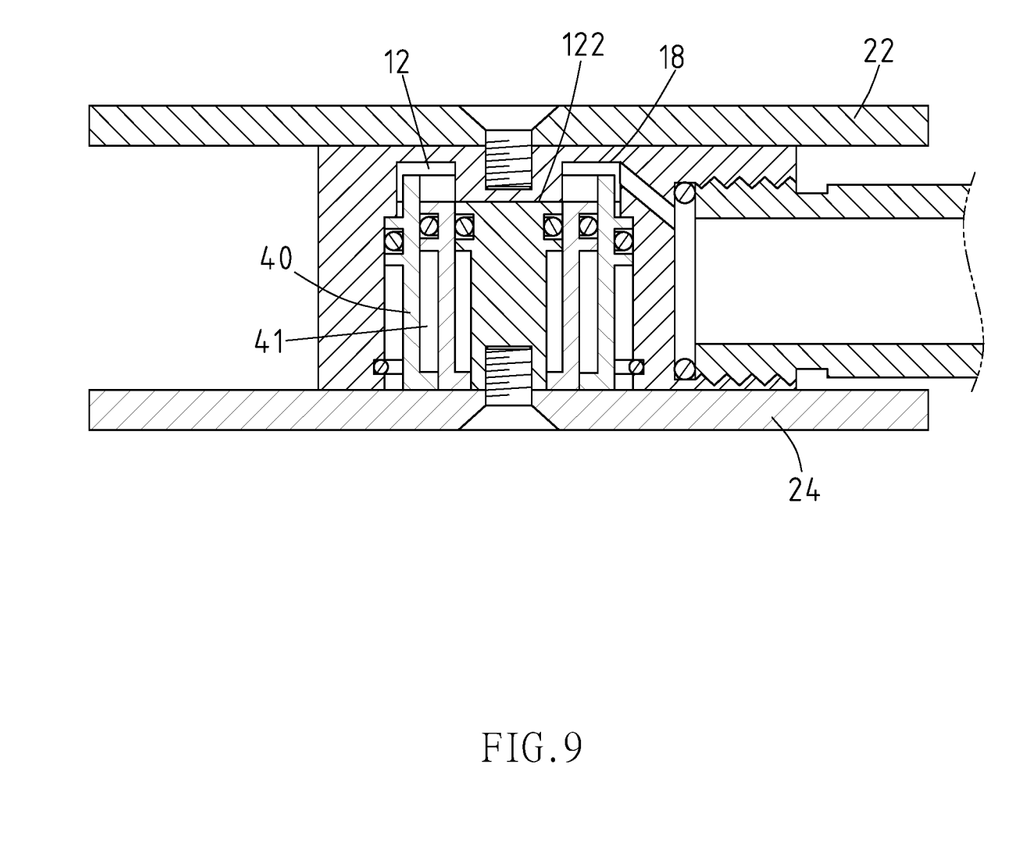
FIG. 9 is a partially enlarged sectional view of the main body of Embodiment 3 of the present invention.
Figure 10:
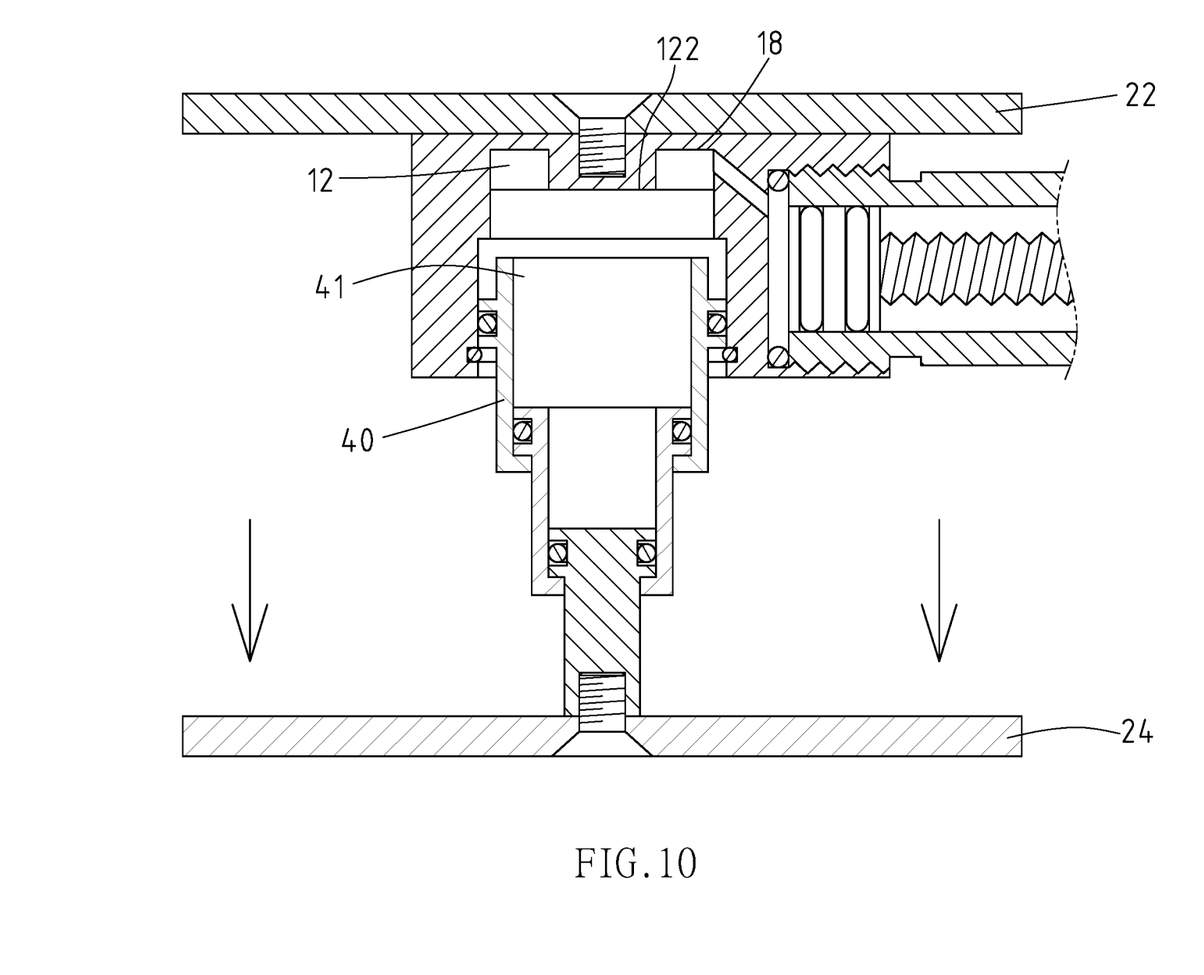
FIG. 10 is a partially enlarged sectional view of the main body of Embodiment 3 of the present invention in operational state.

Referring to FIGS. 9 and 10, the second chamber 12 sags further on the first end 122 in the direction toward the first pressing plate 22 to form a ring groove 18, thus forming Embodiment 3 as another variation based on Embodiment 1. In this way, when the first cylinder barrel 40 moves toward the first pressing plate 22, the first cylinder barrel 40 can further approach the first pressing plate 22, so that the inside of the main body 10 can hold longer first cylinder barrel 40, and the displacement of the second pressing plate 24 can be increased.

Figure 11:
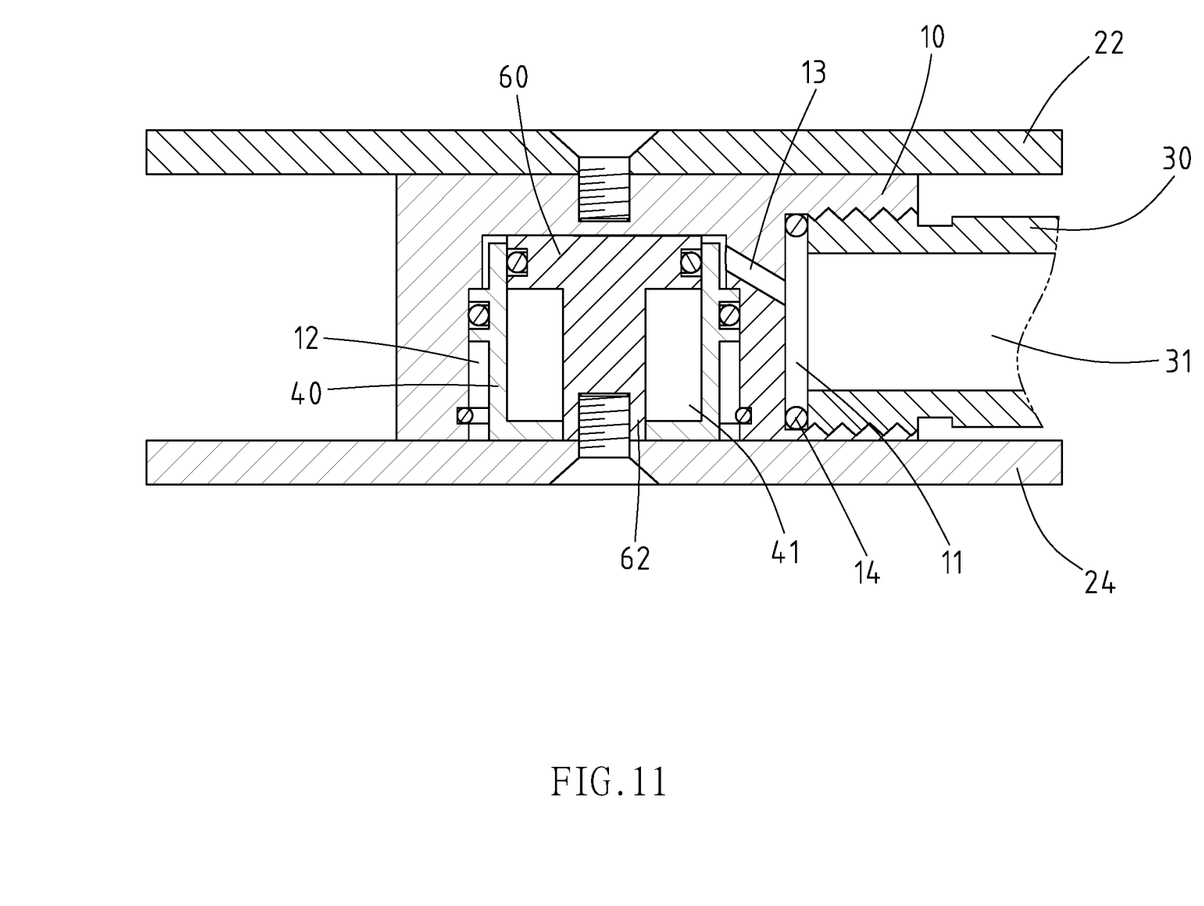
FIG. 11 is a partially enlarged sectional view of the main body of Embodiment 4 of the present invention.
Figure 12:
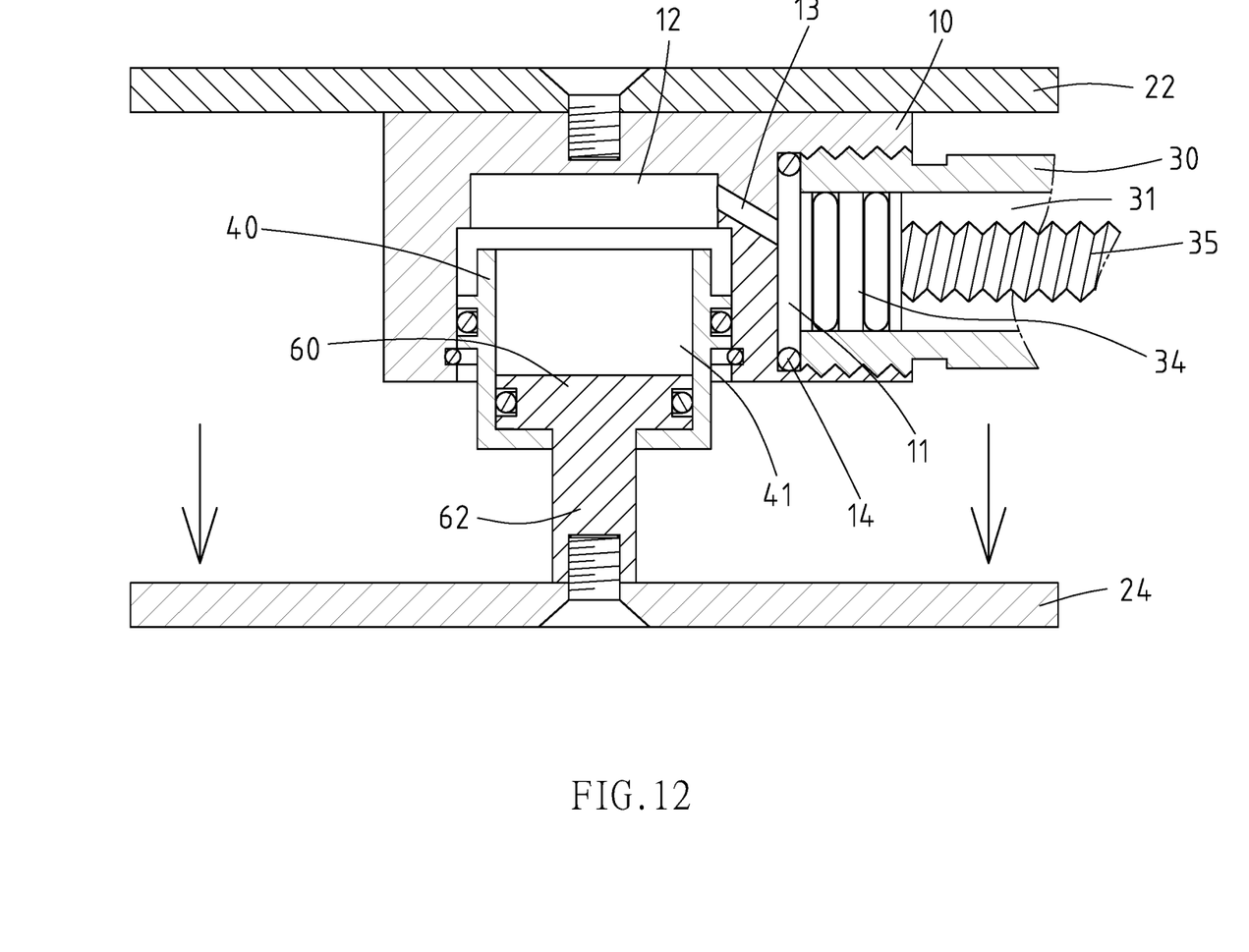
FIG. 12 is a partially enlarged sectional view of the main body of Embodiment 4 of the present invention in operational state.

Embodiment 4 is a further variation based on Embodiment 1. As shown in FIG. 11 and FIG. 12, Embodiment 4 does not have the second cylinder barrel 50 as in Embodiment 1, and one end of the stopping piece 60 of Embodiment 4 is pivotally configured inside the third chamber 41 of the first cylinder barrel 40.

Based on the above structural constitution and technical features, the operation of the present invention of a hydraulic piston resetting tool for disk brake is as follows: when resetting the piston of the disk brake wheel cylinder, the first cylinder barrel 40 and the stopping piece 60 can respectively move away from the first pressing plate 22. The second pressing plate 24 can be pushed farther away from the main body 10 without the need to increase the thickness of the main body 10. The present invention can be applied to reset pistons for calipers of various sizes.

I claim:

1. A hydraulic piston resetting tool for disk brake, including a main body, a first pressing plate, a second pressing plate and a holding pole, wherein:

one side of the main body is connected to the first pressing plate, the second pressing plate is connected to the other side of the main body, and the holding pole is connected to the main body;

the inside of the main body is formed with a first chamber, a second chamber and a communicating passage; the communicating passage is communicated with the first chamber and the second chamber; the second chamber is extended on the side of the main body adjacent to the second pressing plate; the main body is pivotally configured with a first cylinder barrel inside the second chamber; the inside of the first cylinder barrel is formed with a third chamber; the third chamber is communicated with the second chamber; the first cylinder barrel is pivotally configured with a second cylinder barrel inside the third chamber; the inside of the second cylinder barrel is formed with a fourth chamber; the fourth chamber is communicated with the third chamber; the second cylinder barrel is pivotally configured with a stopping piece inside the fourth chamber; one end of the stopping piece is formed with an extension rod in the axial direction; the extension rod goes through the second cylinder barrel and is connected to the second pressing plate;

the holding pole is connected to the main body; the holding pole is formed with a cylinder chamber, which is communicated with the first chamber; working fluid is filled between the cylinder chamber and the stopping piece.

2. The hydraulic piston resetting tool for disk brake defined in claim 1, wherein:

one end of the second chamber is first end, the other end is second end; the first end is adjacent to the first pressing plate, whereas the second end is adjacent to the second pressing plate; the middle portion of the periphery of the first cylinder barrel is expanded to form a first ring plate; the communicating passage is communicated with the side of the second chamber located between the first end and the first ring plate;

the end of the first cylinder barrel adjacent to the second pressing plate is formed with a ring-shaped first limiting plate; the periphery of one side of the second cylinder barrel adjacent to the first pressing plate is formed with two ring-shaped third ring plates; the periphery of the second cylinder barrel is sleeved with a second seal ring on each of the third ring plates; the inner diameter of the first limiting plate is smaller than the outer diameter of the third ring plates, so that the first limiting plate can limit the distance of movement of the second cylinder barrel in the direction away from the first pressing plate;

the side of the second cylinder barrel adjacent to the second pressing plate is formed with a ring-shaped second limiting plate; the periphery of one end of the stopping piece adjacent to the first pressing plate is formed with two ring-shaped fourth ring plates; the outer periphery of the stopping piece is sleeved with a third seal ring between the fourth ring plates; the inner diameter of the second limiting plate is smaller than the outer diameter of the fourth ring plates, so that the second limiting plate can limit the distance of movement of the stopping piece in the direction away from the first pressing plate.

3. The hydraulic piston resetting tool for disk brake defined in claim 2, wherein, the second chamber is formed with a first side wall; one end of the first side wall is connected to the first end, and the other end of the first side wall is formed with a ring-shaped supporting surface; the supporting surface is adjacent to the first end, and the communicating passage is communicated with the side of the second chamber located between the first end and the supporting surface, so that the first ring plate can be pushed against the supporting surface.

4. The hydraulic piston resetting tool for disk brake defined in claim 2, wherein, the inner wall of one side of the second chamber adjacent to the second pressing plate is embedded with a first snap ring; the middle portion of the periphery of the first cylinder barrel is expanded outward to form a second ring plate; the second ring plate is located between the first ring plate and the first snap ring; a first seal ring is sleeved between the first ring plate and the second ring plate.

5. The hydraulic piston resetting tool for disk brake defined in claim 1, wherein:
   the side of the third chamber adjacent to the first pressing plate is embedded with a second snap ring; the inner diameter of the second snap ring is between the inner diameter and outer diameter of each of the third ring plates, so that the second snap ring can limit the distance of movement of the second cylinder barrel in the direction toward the first pressing plate;
   the side of the fourth chamber adjacent to the first pressing plate is embedded with a third snap ring; the inner diameter of the third snap ring is between the inner diameter and outer diameter of each of the fourth ring plates, so that the third snap ring can limit the distance of movement of the stopping piece in the direction toward the first pressing plate.

6. The hydraulic piston resetting tool for disk brake defined in claim 1, wherein, the second chamber sags further on the first end in the direction toward the first pressing plate to form a ring groove.

7. The hydraulic piston resetting tool for disk brake defined in claim 1, wherein, the rear end of the holding pole enters the first chamber and is connected to the main body; the inside of the holding pole is further formed axially with a screw hole; the screw hole is configured on the front end of the holding pole; the rear end of the cylinder chamber is communicated with the first chamber; the inside of the cylinder chamber is pivotally configured with a plunger; working fluid is filled between the plunger and the stopping piece; the holding pole is configured with a screw rod through threaded joint into the screw hole; the front end of the screw rod is protruding out of the front end of the holding pole; the rear end of the screw rod is axially connected to the plunger, so that the plunger can move toward the communicating passage or away from the communicating passage; thus, the working fluid can activate the reciprocating displacement of the stopping piece.

8. A hydraulic piston resetting tool for disk brake, include a main body, a first pressing plate, a second pressing plate and a holding pole, wherein:
   one side of the main body is connected to the first pressing plate, the second pressing plate is adjacent to the other side of the main body, and the holding pole is connected to the main body;
   the inside of the main body is formed with a first chamber, a second chamber and a communicating passage; the communicating passage is communicated with the first chamber and the second chamber; the second chamber is extended on the side of the main body adjacent to the second pressing plate; the main body is pivotally configured with a first cylinder barrel inside the second chamber; the inside of the first cylinder barrel is formed with a third chamber; the third chamber is communicated with the second chamber; the first cylinder barrel is pivotally configured with a stopping piece inside the third chamber; one end of the stopping piece is formed with an extension rod in the axial direction; the extension rod goes through the first cylinder barrel and is connected to the second pressing plate;
   the rear end of the holding pole is connected to the main body; the inside of the holding pole is formed with a cylinder chamber in the axial direction; the cylinder chamber is communicated with the first chamber; working fluid is filled between the cylinder chamber and the stopping piece.

\* \* \* \* \*